United States Patent [19]

Jarmon

[11] Patent Number: 4,909,872
[45] Date of Patent: Mar. 20, 1990

[54] PROCESS FOR MAKING A FIBER REINFORCED COMPOSITE ARTICLE

[75] Inventor: David C. Jarmon, Kensington, Conn.

[73] Assignee: United Technologies Corporation, Hartford, Conn.

[21] Appl. No.: 132,388

[22] Filed: Dec. 15, 1987

[51] Int. Cl.$^4$ ............................................. C03B 29/00
[52] U.S. Cl. ................................. 156/89; 156/155; 156/296; 156/307.5; 156/307.7; 156/329; 428/113; 428/294
[58] Field of Search .................. 428/113, 294; 156/89, 156/155, 296, 307.5, 307.7, 329

[56] References Cited

U.S. PATENT DOCUMENTS

| H,347 | 10/1987 | Layden et al. | 428/294 |
|---|---|---|---|
| 4,256,378 | 3/1981 | Prewo et al. | 350/310 |
| 4,268,562 | 5/1981 | Bacon et al. | 428/113 |
| 4,324,843 | 4/1982 | Brennan et al. | 428/294 |
| 4,341,826 | 7/1982 | Prewo et al. | 428/35 |
| 4,460,638 | 7/1984 | Haluska | 428/294 |
| 4,460,639 | 7/1984 | Chi et al. | 428/224 |
| 4,460,640 | 7/1984 | Chi et al. | 428/294 |
| 4,554,197 | 11/1985 | Chyung et al. | 428/294 |
| 4,613,473 | 9/1986 | Layden et al. | 264/103 |
| 4,626,461 | 12/1986 | Prewo et al. | 428/113 |
| 4,738,902 | 4/1988 | Prewo et al. | 428/294 |

Primary Examiner—Marion C. McCamish

[57] ABSTRACT

A process for making a fiber reinforced glass matrix composite article is disclosed. Monofilament fiber is wound on a mandrel to form a monofilament fiber layer and the monofilament fiber layer is coated a binder to form a monofilament fiber tape. Yarn fiber is wound on a mandrel to form a yarn fiber layer and the yarn fiber layer is coated with a slurry of glass matrix material and binder to form two yarn fiber tapes. The monofilament fiber tape is sandwiched between the yarn fiber tapes to form a composite ply. Composite plies are laid up to for a composite preform. The composite preform is consolidated to form a fiber reinforced glass matrix composite article. A product made by the above process is also disclosed.

4 Claims, 1 Drawing Sheet

(50 X)

(200 X)

PROCESS FOR MAKING A FIBER REINFORCED COMPOSITE ARTICLE

CROSS REFERENCE TO RELATED APPLICATIONS

This invention is related to the invention disclosed in copending patent applications entitled "Fiber Reinforced Composite Article" (Serial No. 07/132389) and "Rotor for Gas Turbine Engine" (Serial No. 07/133093), filed by David C. Jarmon and Karl M. Prewo, respectively on even date and assigned to the same assignee of this application.

TECHNICAL FIELD

The technical field to which this invention pertains is that of fiber reinforced composites.

BACKGROUND ART

It has been widely recognized, particularly within the aerospace and automotive industries, that the selective use of fiber reinforced composite materials to replace metals can result in significant performance benefits. These benefits flow from the exceptional combination of high stiffness, high strength and low density that typically characterize fiber reinforced composite materials and from the ability to tailor the properties of a particular composite article to fit the demands of a particular application.

Fiber reinforced glass matrix and fiber reinforced glass ceramic matrix composites have been developed for high temperature applications. These materials exhibit high strength, high modulus, and high fracture toughness at temperatures which exceed 1,000° F.

There is a constant and intensive effort to improve the room temperature physical properties of such materials and to increase the maximum use temperature and the environmental stability of such materials.

DISCLOSURE OF INVENTION

A process for making a fiber reinforced glass matrix composite article is disclosed. Multifilament yarn is wound onto a mandrel, the yarn fibers are spread over the surface of the mandrel to produce a single layer of yarn fibers, and a slurry of glass powder and binder is applied to the layer of yarn fibers to form a multifilament yarn tape. A single layer of monofilament fiber is wound on a mandrel, and a binder is applied to the single layer of monofilament fiber to form a monofilament tape. A layer of the monofilament tape is stacked between two layers of the multifilament yarn tape to form a hybrid composite ply. A stack of hybrid composite plies is laid up in a selected pattern, and the stack of hybrid composite plies is consolidated to form the fiber reinforced glass matrix composite article. The process allows the fabrication of composite articles having high strength, high stiffness and high fracture toughness. A fiber reinforced glass matrix composite article made by the above process is also disclosed.

The foregoing and other features and advantages of the present invention will become more apparent from the following description and accompanying drawings.

BEST MODE FOR CARRYING OUT THE INVENTION

Figure 1:
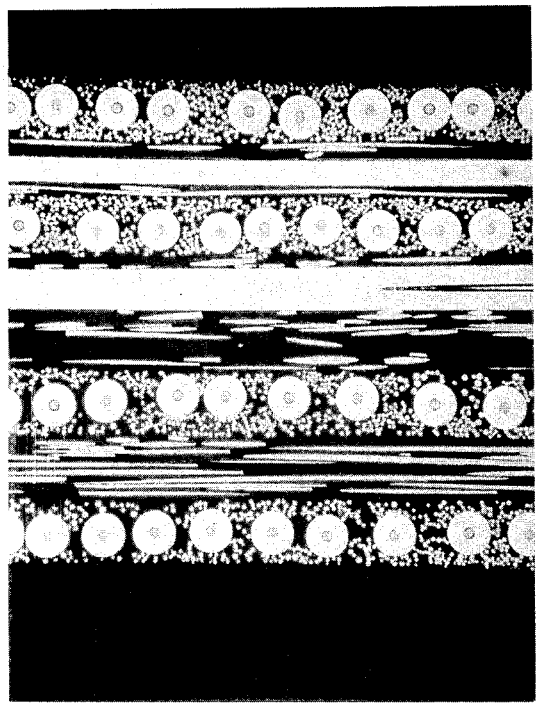
FIG. 1 shows a transverse cross-sectional view of a monofilament fiber and yarn fiber reinforced article at 50× magnification.

The glass matrix material of the present invention is chosen on the basis of its temperature resistance and its chemical and thermal compatibility with the fiber reinforcement. Glasses which are chemically compatible with the fiber reinforcement do not react to substantially degrade the fiber reinforcement during processing. A glass matrix material is thermally compatible with the fiber reinforcement if the coefficient of thermal expansion of the glass and the fiber reinforcement are sufficiently similar that the composite article will not delaminate during thermal cycling due to excessive thermal stresses generated by differential thermal expansion of the glass matrix and the fibers. Borosilicate glass (e.g. Corning Glass Works (CGW) 7740), alumina silicate glass (e.g. CGW 1723) and high silica glass (e.g. CGW 7930) as well as mixtures of glasses are suitable matrix materials. Glass-ceramic materials, such as lithium alumino silicate (LAS) magnesium alumino silicate (MAS), and calcium alumino silicate (CAS), which may be partially crystallized during processing, as well as mixtures of glass ceramic materials and mixtures of glass materials and glass ceramic materials may also be used as the glass matrix material of the present invention. The choice of glass matrix material is dependent upon the particular demands of the intended application. For example borosilicate glass is the preferred glass matrix material for applications which require resistance to temperature of up to about 550° C., because while its temperature resistance is low in relation to the other glass materials, borosilicate glass is more easily processed than the other glass materials. For applications which require resistance to temperatures of up to about 1200° C., glass ceramic materials, particularly LAS, are preferred matrix materials due to their superior temperature resistance.

The yarn fiber reinforcement of the present invention may comprise any inorganic yarn fiber that exhibits high tensile strength and high tensile modulus at elevated temperatures. Yarn fibers are small diameter fibers commercially available in multifilament (typically 500 or more filaments) tows. Inorganic yarns fibers are typically produced by heat treating spun organic precursor fibers and are less than 30 microns in diameter. Suitable inorganic yarn fibers include graphite fibers, silicon carbide fibers, and refractory metal oxide fibers. The choice of yarn fiber material is dependent upon the particular demands of the intended application. For applications in which high strength, high stiffness, and high fracture toughness are of primary concern, SiC fibers are preferred. Nicalon ceramic grade fiber (Nippon Carbon Company) is a SiC yarn that has been found to be particularly suitable for the practice of the present invention. The Nicalon yarn fiber is available in 500 filament tows with an average fiber diameter between 5-15 microns and has a tensile strength of about 2,070 Megapascals (MPa) and an elastic modulus of about 176 (GPa).

The monofilament fiber of the present invention may comprise any inorganic monofilament fiber that exhibits high tensile strength and high tensile modulus at elevated temperatures. Monofilament fibers are relatively large diameter fibers available as a single filament. Inorganic monofilament fibers are typically produced by the chemical vapor deposition of the fiber material on a carbon or tungsten core, and are typically greater than about 100 microns in diameter. Suitable inorganic monofilament fibers include silicon carbide monofilament and boron monofilament fibers. The choice of a particular monofilament is dependent upon the particular demands of the intended application. For applications in which high strength and high stiffness are of primary concern, SiC carbon fibers and preferred. SCS-6 silicon carbide monofilament fiber available from AVCO Specialty Materials Division is particularly suitable for practice of the present invention. SCS-6 has an ultimate tensile strength of about 3,450 MPa and an elastic modulus of about 413 GPa.

The monofilament reinforcement may comprise a volume fraction of between 5 percent and 50 percent of the composite article. The yarn fiber reinforcement may comprise a volume fraction between 15 percent and 50 percent of the article. The matrix may comprise a volume fraction of between 20 percent and 50 volume percent of the article.

The relative proportions of the matrix material, the monofilament fiber reinforcement and the yarn fiber reinforcement may be selected within the above ranges to obtain a particular balance of properties in the composite article. The choice of a particular balance of properties is based on consideration of the particular demands of the intended application. For example, in an application in which the properties of high strength, high modulus, and high fracture toughness are of primary importance, it is preferred that the matrix material comprise a volume fraction of between about 30 percent and 40 percent, the monofilament fiber reinforcement comprise a volume fraction of between about 40 percent and about 50 percent and the yarn fiber reinforcement comprise between about 20 percent to about 30 percent. By including a high volume fraction of each type of fiber reinforcement in the composite, the relative contribution of the fibers (i.e. high strength, high stiffness) to the physical properties of the composite article is increased.

The particular composition required to adjust a particular property to be within a desired range of values may be calculated using rule of mixture equations modified to reflect the presence of two types of reinforcing fibers. For example, the longitudinal and transverse moduli for a unidirectionally oriented monofilament and yarn fiber reinforced article may be predicted by the following equations (adapted from equations developed by Halpin & Tsai, J. C. Halpin, Primer on Composite Materials: Analysis, pp. 130–142, Technomic Pub. Co. Lancaster, Pa., 1984).

$$E_{11} = V_{f1}E_{11f1} + V_{f2}E_{11f2} + V_m E_m$$

and $$E_{22} = E_m \left[ \frac{(1 + \zeta \eta_2 V^*_{f2})}{(1 - \eta_2 V^*_{f2})} \right] \left[ \frac{(1 + \zeta \eta_1 V_{f1})}{(1 - \eta_1 V_{f1})} \right]$$

where
$E_{11}$ = longitudinal composite modulus
$E_{11f1}$ = fiber 1 longitudinal modulus
$E_{11f2}$ = fiber 2 longitudinal modulus
$E_{22}$ = transverse composite modulus
$E_{22f1}$ = fiber 1 transverse modulus
$E_{22f2}$ = fiber 2 transverse modulus
$E_m$ = matrix modulus
$V_{f1}$ = volume percent fiber 1
$V_{f2}$ = volume percent fiber 2
$V^*_{f2}$ = volume percent fiber 2 in glass only
$V_m$ = volume percent matrix
$\eta_1 = [(E_{f1}/E_m) - 1]/[(E_{f1}/E_m) + 2]$
$\eta_2 = [(E_{f2}/E_m) - 1]/[(E_{f2}/E_m) + 2]$
$\zeta = 2$ = constant The process of the present invention includes preparing a plurality of monofilament fiber tapes, preparing a plurality of yarn fiber tapes, sandwiching each monofilament tape between two yarn tapes to form a plurality of composite plies, stacking the composite plies to form a composite preform and consolidating the composite preform to form the composite article.

The monofilament fiber tape is formed by winding a single layer of monofilament from a spool onto a rotating mandrel to provide a monofilament fiber layer having a selected number of turns of fiber per unit width of the layer and applying a film of organic binder to the layer. Any film forming organic binder may be used. Aqueous binders are preferred. A binder found to be particularly well suited to the present application is an aqueous acrylic emulsion known as Rhoplex AC-33 manufactured by Rhom and Haas. The binder is dried and the monofilament tape is removed from the mandrel and cut into sections for subsequent processing.

The yarn fiber tape is fabricated by winding a tow of yarn filaments from a spool onto a rotating mandrel. The tow is passed from the spool to the mandrel under low tension. The tow is passed through a flame of furnace to thermally decompose the sizing on the fibers. The fiber tow is wrapped around the mandrel a selected number of turns. The number of turns of yarn fiber tow is selected to provide a yarn fiber layer having a selected number of fibers per unit width of the layer. The number of fibers per unit width of the yarn fiber layer is selected to provide a selected ratio of yarn fiber to monofilament fiber in the subsequently formed composite ply. The ratio of yarn fiber to monofilament fiber in the composite ply is selected to provide the relative volume fractions of the two fibers required to obtain a particular balance of properties desired in the composite article.

A measured quantity of a slurry containing an organic binder and known concentration of a powdered matrix material is applied to the yarn fiber layer. An inert film (e.g. Mylar) is wrapped around the mandrel to cover the layer of yarn fiber and the quantity of slurry. The film prevents premature drying of the slurry and minimizes damage to the fiber during subsequent rolling procedure. The slurry and the fibers are spread over the mandrel surface by applying pressure to the film surface with a roller. It should be noted that a critical aspect of the fabrication of the yarn tape is the spreading of the yarn fibers evenly across the mandrel surface to obtain a uniform distribution of yarn fiber per unit width of the fiber layer. The rolling process evenly forces the slurry between the fibers. The loosely wound yarn fibers move laterally with the slurry and spread across the surface of the mandrel. The rolling is continued until a substantially uniform distribution of fibers and slurry is obtained. The film is then removed and the slurry is dried by exposure to a heat source to form a yarn fiber tape. Once dry, the tape is cut in a direction parallel to the longitudinal axis of the mandrel and removed from the mandrel. After removal from the mandrel the tape is cut into sections suitable for subsequent processing steps.

The individuadl composite plies are formed by sandwiching one section of monofilament tape between two sections of yarn tape. The sections of tape are aligned such that the yarn and monofilament fibers run parallel to each other in the composite ply.

The composite plies are stacked in a desired composite preform. The layup may be warm molded to partially debulk the preform and to help move the yarn filaments in between the monofilament fibers. The binder is then thermally decomposed by heating the preform, preferably in air. If graphite fibers are used, the binder must be decomposed in an inert atmosphere to avoid degradation of the graphite fibers.

The preform is then consolidated to form the composite article. The preform may be consolidated by hot pressing, by hot isostatic pressing, by hot pultrusion or by hot rolling.

EXAMPLE

A monofilament fiber tape was fabricated. AVCO SCS-6 silicon carbide monofilament fiber was wound on a 12 inch diameter round mandrel. The mandrel was covered with a 0.001 inch thick film of inert material (Mylar). The monofilament was wound on the covered mandrel at 128 turns per inch for a width of 4 inches. A layer of binder (Rhoplex AC-33) was applied with a paint brush to coat the monofilament layer. The coated monofilament layer was dried on the mandrel with a heat lamp for 30 minutes to form a monofilament tape. Once dried, the tape was cut at one location and removed from the mandrel and then cut into 4"×4" sections.

Two yarn fiber tapes were fabricated. For each tape, a 12 inch diameter mandrel was tightly wrapped with a 0.001 inch thick film of inert material (Mylar). A ⅛ inch diameter tensioning rod was inserted under the film parallel to the longitudinal axis of the mandrel. A tow of Nicalon silicon carbide yarn fibers was drawn off a spool with no applied back tension, passed through a flame to thermally decompose the yarn sizing, and wound on the mandrel at 7 turns per inch for a width of 4 inches. After winding the tensioning rod was removed to loosen the yarn turns. A slurry comprising one part by weight CGW 7740 borosilicate glass powder and 2 parts by weight Rhoplex AC-33 acrylic binder was mixed. Pools of the slurry (totaling 24.7 grams) were applied to the fibers with a spoon at relatively uniform spacing. A layer of 0.001 inch thick inert film (Mylar) was wrapped around the fiber/slurry layer on the mandrel. The slurry was evenly distributed over the fibers and the fibers were spread across the surface of the mandrel by applying light pressure to the fiber/slurry layer in the direction of the fiber axis with a 4" wide, 1" diameter hand held rubber roller. The film was removed and the tape was dried with a heat lamp for 30 minutes to form a yarn fiber tape. The tape was cut in one location and removed to the mandrel. The tape was cut into eight 4"×4" sections.

Hybrid composite plies were formed by sandwiching a 4"×4" section of the monofilament tape between two sections 4"×4" yarn tape. Eight individual hybrid composite plies were formed in this manner. The hybrid composite plies were stacked in a 0°/90° orientation with symmetry about the center line. The laid up stack was warm molded at 150° C. and 100 psi for 10 minutes. The stack was then placed between ceramic platens and the binder was thermally decomposed by heating at 500° C. for 2 hours in the air. The layup was then rigidized by heating to 700° C. for 10 minutes in air to lightly fuse the glass particles together. The composite preform was then vacuum hot pressed at 1,250° C. for 30 minutes at 1,000 psi to consolidate the composite article.

The physical properties of the article so formed were measured and compared to an analogous monofilament reinforced article. The results are shown in Table 1.

TABLE 1

| | Monofilament/yarn Reinforcement | Monofilament Reinforcement |
|---|---|---|
| Composite Number | 383-86 | 159-86 |
| Fiber v/o | | |
| SiC monofilament | 39.2 | 38.6 |
| SiC yarn | 23.0 | 0 |
| 7740 glass | 33.8 | 58.2 |
| Lay-up | 0/90 | 0/90 |
| Tensile Strength (MPa) | 496 | 348 |
| (ksi) | 72 | 50 |
| Strain to Failure (%) | 0.56 | 0.45 |
| Prop. Limit Stress (MPa) | 57 | 33 |
| (ksi) | 8 | 5 |
| Prop. Limit Strain (%) | 0.038 | 0.031 |
| Elastic Modulus (GPa) | 145 | 101 |
| (Msi) | 21 | 15 |
| Flexural Strength (MPa) | 1,041 | 584 |
| (ksi) | 151 | 85 |
| Coef. Thermal Exp. ($\times 10^{-6}$/°C.) 25 to 300° C. | 2.4 | 4.9 |

Figure 2:
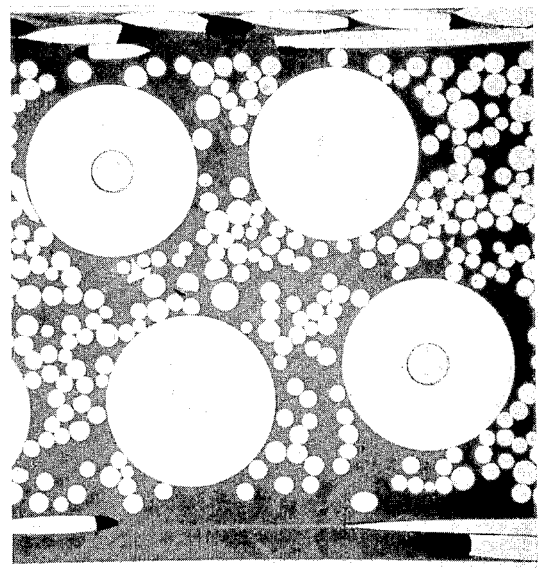
FIG. 2 shows an enlarged longitudinal cross-sectional view of the article shown in FIG. 1 at 200× magnification.

Cross-sectional view of the article, showing the distribution of the monofilament and yarn fiber reinforcements are shown in FIGS. 1 and 2. FIG. 1 shows a transverse cross-sectional view of the article and FIG. 2 shows an enlarged longitudinal cross-sectional view of the article.

In each of the Figures, large diameter monofilament fibers are surrounded by small diameter yarn fiber reinforced glass matrix. It is important to note that the yarn fibers are uniformly distributed throughout the glass matrix, i.e., the yarn fibers are not distributed in discrete layers, and there are no large glass rich regions between the monofilament fibers. The preferred fiber distribution is most clearly visible in Figure II.

The monofilament and yarn reinforced composite article of the present invention exhibited higher tensile strength, a higher elastic modulus, and much higher flexural strength than that exhibited by the monofilament reinforced article.

The process of the present invention allows fabrication of glass matrix composites reinforced with both monofilament fibers and yarn fibers. The process allows selection of the volume fraction of each type of fiber reinforcement and allows the distribution of each type of fiber within the matrix to be controlled. The ability to control the volume fraction of each type of fiber and control the distribution of each type of fiber in the matrix makes possible the high strength, high stiffness composites which exhibit high fracture toughness, and also allows more precise tailoring of other physical properties to enable the fabrication of composite articles which exhibit a previously unobtainable balance of physical properties.

Glass matrix composites reinforced with only SiC monofilament fibers which exhibit very high strength and very high stiffness may be fabricated. Despite the impressive strength and stiffness exhibited by monofilament reinforced glass matrix composites the fracture toughness of these materials is low. Large glassy regions exist between the monofilament fibers and lower the fracture toughness of the composite by providing a potential source of large flaws as well as a free path for crack propagation.

The process of the present invention allows incorporation of a selected distribution of small diameter yarn reinforcement into the matrix of monofilament reinforced composites to inhibit cracking of the matrix and to improve the fracture toughness of the composite. It was not possible to fabricate articles having an advantageous proportion of monofilament fibers to continuous yarn fibers by conventional processes of the form in which the fibers are commercially available. The yarn filaments are available only in tows having large number of filaments per tow For example, Nicalon SiC yarn is purchased with a 500 filaments per tow and simply co-winding the monofilament fiber with the yarn tow would produce a composite with an excess of yarn fibers. Only 50 fibers of SiC yarn per monofilament SiC fiber are required to produce a matrix reinforced with a 40 volume percent Nicalon in a composite with 40 volume percent monofilament. The process of the present invention allows fabrication of hybrid monofilament-/yarn reinforced glass composites wherein the yarn reinforcement comprises less than 50 volume percent of the matrix, and is uniformly distributed.

The process of the present invention allows fabrication of glass matrix composites reinforced with both large diameter monofilament fiber and small diameter yarn fiber. The process allows selection of the volume fraction of each type of fiber and allows the controlled distribution of each type of fiber within the matrix. The ability to control the volume fraction and the distribution of reinforcing fibers of two different diameters allows a higher volume fraction of fiber reinforcement to be obtained in the hybrid composite article than may be obtained with reinforcing fiber of a single diameter. The higher volume fraction of fiber reinforcement may be obtained because selective distribution of fibers which have widely dissimilar diameters allows a higher fiber packing density than may be obtained using only fibers of a similar diameter. The increased volume fraction of reinforcing fibers is reflected in the improved physical properties, particularly in the higher tensile strength and higher elastic modulus, of composite article.

The ability to control the volume fraction and distribution of both monofilament fibers and yarn fibers allows control of the thermal stresses within the composite generated by the differential thermal expansion of the glass matrix and fiber materials.

Although this invention has been shown and described with respect to detailed embodiments thereof, it will be understood by those skilled in the art that various changes in form and detail thereof may be made without departing from the spirit and scope of the claimed invention.

I claim:

1. A process for making a fiber reinforced glass matrix composite article, comprising:
    winding a tow of inorganic multifilament yarn onto a mandrel,
    spreading a mixture of a powdered glass matrix material and a binder over the inorganic yarn fibers to form a multifilament yarn fiber tape,
    winding inorganic monofilament fiber on a mandrel and applying a binder to the inorganic monofilament fiber to form a monofilament fiber tape,
    stacking the monofilament tape between two layers of the multifilament yarn tape so that the monofilament fibers and the yarn fibers are in parallel alignment with each other to form a hybrid composite ply,
    laying up a plurality of hybrid composite plies in a selected pattern to form a composite preform, and
    consolidating the composite preform through heat and pressure to form the fiber reinforced glass matrix composite article,
    said process allowing the fabrication of composite articles which exhibit high strength, high stiffness and high fracture toughness.

2. The process of claim 1 wherein the glass matrix comprises a borosilicate, a high silica glass, an alumino silicate, a lithium alumino silicate, a magnesium alumino silicate, a calcium alumino silicate or mixtures thereof.

3. The process of claim 1 wherein the yarn fibers comprise silicon carbide yarn fibers or graphite yarn fibers.

4. The process of claim 1 wherein the monofilament fibers comprise silicon carbide monofilament fibers or boron monofilament fibers.

* * * * *